Nov. 3, 1953  S. MUELLER  2,657,818
DEVICE FOR INSERTING PLIABLE GROMMETS
Filed Aug. 10, 1950  2 Sheets-Sheet 1
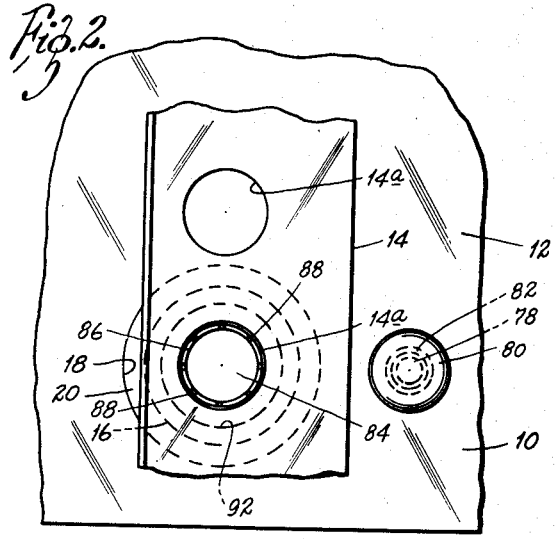
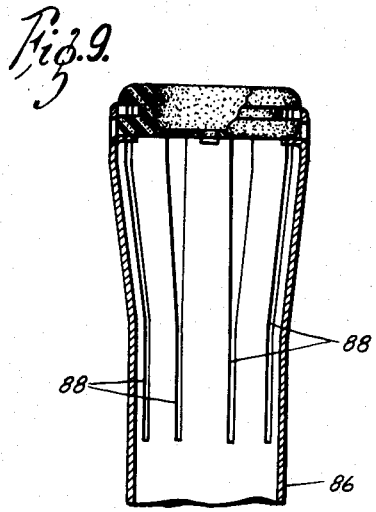
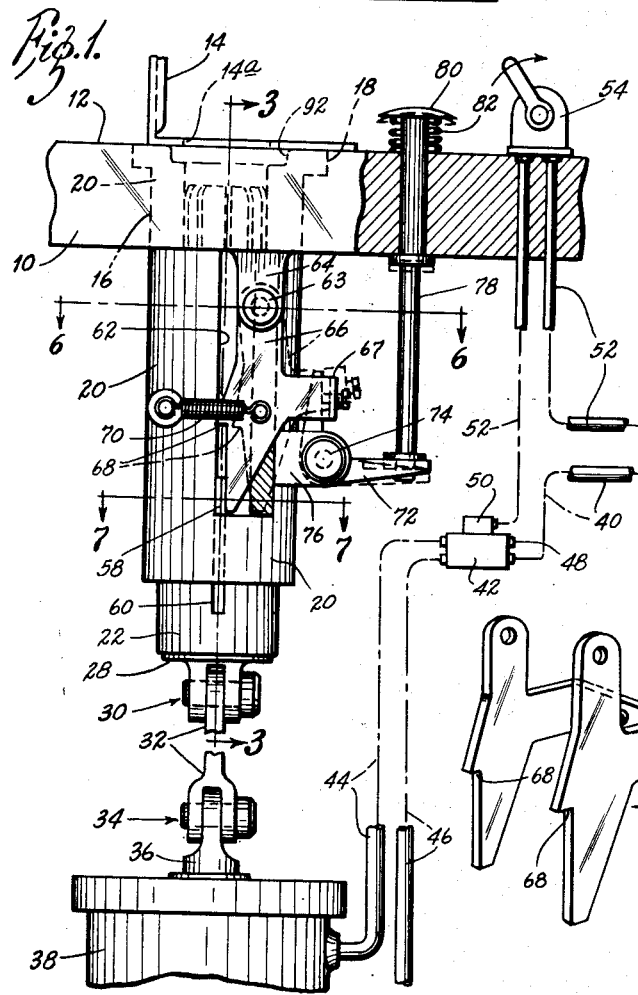
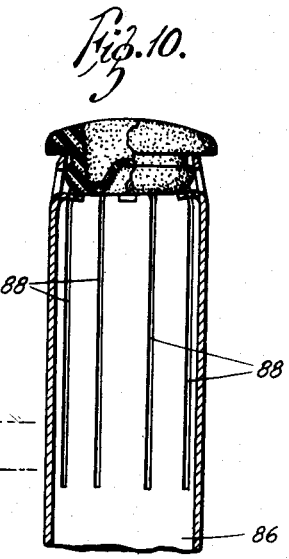
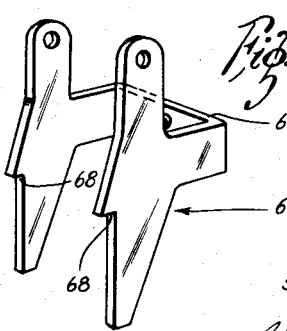
INVENTOR:
SIEGFRIED MUELLER,
BY
HIS AGENT.

Nov. 3, 1953
S. MUELLER
2,657,818
DEVICE FOR INSERTING PLIABLE GROMMETS
Filed Aug. 10, 1950
2 Sheets-Sheet 2
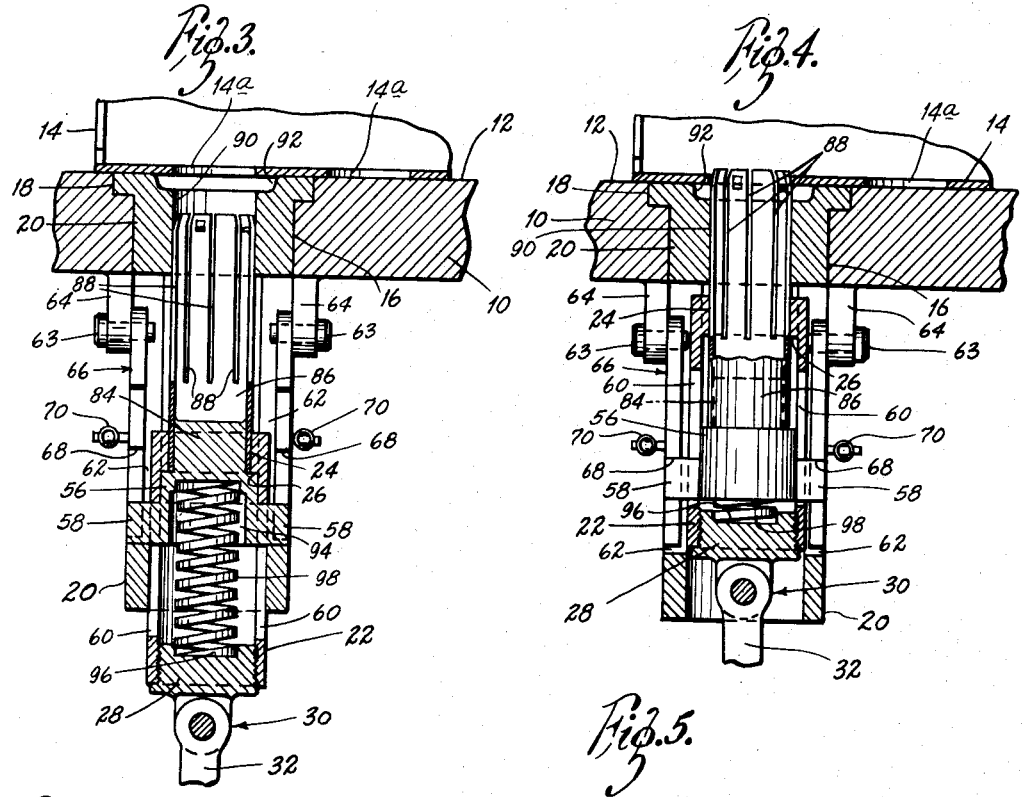
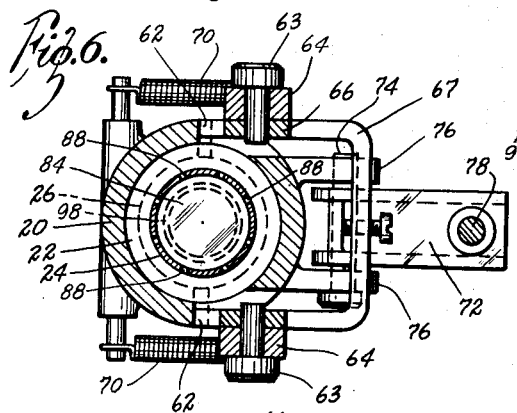
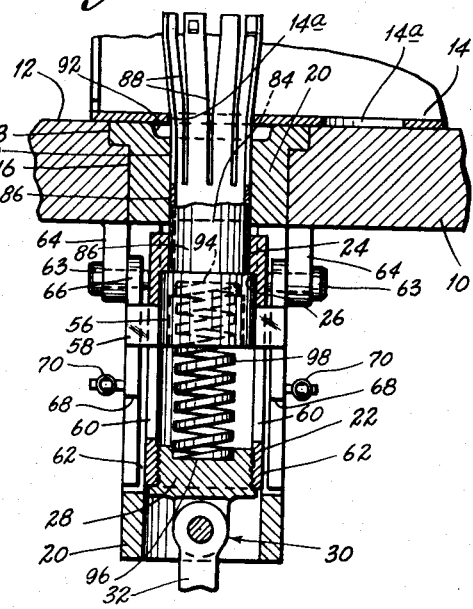
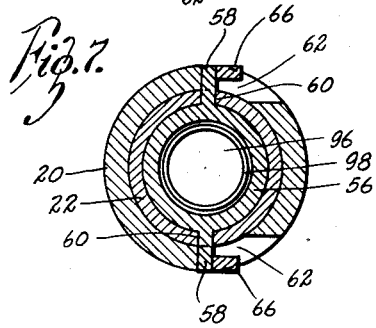
INVENTOR:
SIEGFRIED MUELLER,
BY Charles E. Markham
HIS AGENT.

Patented Nov. 3, 1953

2,657,818

UNITED STATES PATENT OFFICE 2,657,818

DEVICE FOR INSERTING PLIABLE GROMMETS

Siegfried Mueller, St. Louis, Mo., assignor to Missouri Automatic Control Corporation, St. Louis, Mo., a corporation of Missouri Application August 10, 1950, Serial No. 178,580

4 Claims. (Cl. 218—14)

This invention relates to means for inserting grooved pliable grommets into circular wall perforations of smaller diameter than the grommet.

It is an object of the invention to provide mechanism including means for grasping the periphery of a grooved pliable grommet on one side of its groove, for compressing said side of the grommet diametrally, for drawing said compressed side through a circular wall perforation smaller than the grommet and then releasing the grommet when the uncompressed side abuts the wall.

A further object is to provide a grommet inserting device having a plurality of contractable finger elements arranged in a circle for grasping a grommet at its periphery on one side of its groove, and in which the finger elements are caused to be moved radially toward each other thereby to compress the grommets as the finger elements are moved longitudinally.

A further object is to provide in a grommet inserting device a plurality of contractable finger elements arranged in a circle and diverging toward their ends, and having a short portion at their extreme ends formed inwardly to the extent that said short portions are normally substantially parallel with the axis of the circle.

A further object is to provide a grommet inserting device including a reciprocating sleeve member having a resiliently contractable flared end portion for receiving a grommet and having a sizing ring of smaller diameter than the flared end for causing the contraction of the flared end as it is moved longitudinally thereinto, and including power means for reciprocating the sleeve member.

A further object is to provide in a grommet inserting device of this character means for first drawing the sleeve member inwardly from its fully extended and expanded position to a position wherein its flared end portion is within the bore of the sizing ring and fully contracted, then moving the sleeve member outwardly sufficiently so that its flared end projects just slightly from the face of the sizing ring and in which position it is still contracted and may be entered into the wall aperture which receives the grommet, and then moving the sleeve member outwardly through the wall aperture to its fully extended position in which its flared end portion assumes its normally full expanded position for receiving the grommet to be inserted.

These and further objects and advantages will become apparent when reading the following complete description of the invention in connection with the accompanying drawings.

In the drawings:

Fig. 1 is a side elevation, partly in section, of a grommet inserting device constructed in accordance with my invention;

Fig. 2 is a plan view of the device shown in Fig. 1;

Fig. 3 is a sectional view of the device shown in Fig. 1 taken on line 3—3 of Fig. 1. In this view the device is shown in a fully retracted position;

Fig. 4 is also a sectional view of the device taken on line 3—3 of Fig. 1. In this view the device is shown in a partially retracted position, in which position the end of the reciprocating sleeve is projected just sufficiently beyond the face of the sizing ring to be received in the wall aperture into which the grommet is to be inserted;

Fig. 5 is also a cross sectional view taken on line 3—3 of Fig. 1. In this position the reciprocating sleeve is fully extended and the flared end portion thereof fully expanded to receive a grommet to be inserted;

Fig. 6 is a transverse sectional view taken on line 6—6 of Fig. 1;

Fig. 7 is a transverse sectional view taken on line 7—7 of Fig. 1;

Fig. 8 is a perspective view of the pivoted detent;

Fig. 9 is an enlarged sectional view of the flared end of the reciprocating sleeve member shown in its fully expanded position, wherein a conventional grooved pliable grommet is shown in connection therewith placed in its proper position; and Fig. 10 is an enlarged sectional view of the flared end of the reciprocating sleeve member shown in a fully contracted position and in which one side of the pliable grommet shown in Fig. 9 is compressed so that it may be entered into a wall perforation smaller than the diameter of the grommet.

Referring to the drawings more particularly, the illustrated embodiment of the invention comprises a horizontal support member 10 shown in part. The support member 10 has an upper flat surface 12 suitable for resting the perforated wall of a casing or the like which is indicated in part at 14 and which is provided with circular perforations 14a which are substantially the same diameter as the base of the grommet grooves. The support member 12 has a vertical bore 16 and a counterbore 18 which receives in pressed fit relationship the upper end of a shouldered outer sleeve member 20, which extends downward below the support member. Slidably fitted in the lower end of the outer sleeve 20 is a second sleeve member 22. The sleeve member 22 has a reduced internal diameter portion 24 at its upper end, see Fig. 3, and a square shoulder 26 is formed at the point of reduction in diameter. The lower end of sleeve 22 is provided with a screw threaded end closing plug 28. The end closing plug 28 is provided with suitable means as indicated at 30 for pivotally attaching thereto one end of a connecting rod 32. The other end of the connecting rod 32 is pivotally connected in a suitable manner as indicated at 34, see Fig. 1, to the piston rod 36 of a reciprocating type compressed air motor shown in part at 38.

Compressed air for the operation of air motor 38 is supplied through a main conduit 40 to a four way pressure operated valve 42. The four way valve 42 is of conventional design having an actuated position in which air is admitted from line 40 through a line 44 to the top of the air motor cylinder and exhausted through a line 46 and an exhaust port 48, and having a normal returned position in which air is admitted from line 40 through line 46 to the lower end of the air motor cylinder and exhausted through line 44 and the exhaust port 48. The four way valve 42 is provided with a pneumatic actuator 50 to which compressed air is supplied from a source through an air conduit 52. Interposed in the air conduit 52 is a manually operated valve 54 for controlling the actuation of the four way valve 42 and which is mounted for convenient operation on the top surface 12 of the support member 10.

Slidably fitted within the sleeve member 22 is a short cylindrical member 56 having a pair of flat laterally extending wing members 58 which extend through longitudinal slots 60 in sleeve member 22 and through longitudinal slots 62 in outer sleeve member 20. Pivotally mounted on pivots 63 is a U-shaped detent 66. The pivots 63 are supported in lugs 64 which depend from the lower side of member 10. The detent 66 is provided with abutment surfaces 68 on each of its parallel legs which are adapted to be engaged by the upper edges of the wing members 58. A pair of springs 70 normally hold the detent 66 in a position wherein its abutting surfaces 68 are in position to be engaged by the wing portions 58. The detent 66 is arranged to be rotated counterclockwise, by a bell-crank lever 72, to a position in which the wing portions 58 will not engage the abutment surfaces 68. The lever 72 is pivotally mounted on a pivot 74 which is supported in a pair of lugs 76 formed integral with the outer sleeve member 20. One leg of lever 72 is adapted to engage the inner surface of the connecting leg 67 of the U-shaped detent member 66 and the other leg of lever 72 is adapted to be engaged by a vertical trip pin 78 which is slidably mounted in the support member 10. The trip pin 78 is provided at its upper end with a head 80 and is normally urged upwardly by spring 82.

The short cylindrical member 56 is provided with a reduced upper portion 84, see Fig. 3, over which is fitted the lower end of an expansible sleeve member 86. The lower end of sleeve member 86 is rigidly attached to the upper part of cylindrical member 56 as by soldering or welding and it slidably fits within the upper reduced internal diameter portion 24 of sleeve 22. The expanding sleeve member 86 is constructed of relatively thin walled metal tubing and is provided with a plurality of circumferentially spaced longitudinal slits 88 extending from one end of the tube, thereby providing a plurality of resilient finger members 89. After the tube has been slit the finger members 89 are formed so as to diverge toward their outer ends resulting in the flared or bell-shaped form as indicated in Figs. 5 and 9. The extreme outer ends of the fingers 89 are formed inwardly as indicated at 91 so as to be substantially parallel with the unformed cylindrical portion of the tube or with the longitudinal center line of the tube. This amount of inward forming at the extreme end of the sleeve provides a sufficient bight by which a holding force on the pliable grommet is exerted, as indicated in Fig. 10, to insure that the grommet will not move outward as it is compressed by the contracting fingers 89 as they are drawn through a wall aperture, but does not result in a holding force which is great enough to tend to pull the grommet completely through the wall aperture. Also, this amount of inward forming at the end of the expansible sleeve provides a tapered end when the sleeve is in its contracted position which facilitates entering the end of the sleeve in the wall aperture as indicated in Fig. 4.

In order to facilitate the proper positioning of the grommet within the end of the sleeve 86 preparatory to its being inserted, a number of stop elements 93 are provided. These stop elements are preferably provided by punching out and forming inwardly small rectangular portions of the finger members 89, as indicated in Figs. 9 and 10. These stop members are positioned so as to permit insertion of a grooved grommet to the point, as indicated in Fig. 9, wherein the ends of the fingers 89 may extend to the far side of the grommet groove, but not beyond, so that only that portion of a grommet which lies on one side of its groove will be compressed.

The upper end of the outer sleeve member 20 is provided with a reduced bore 90 of substantially the same diameter as the lower part of sleeve 86 and which provides a sizing ring for contracting the expansible sleeve a predetermined amount. The extreme upper end of the outer sleeve 20 is provided with a counterbore 92 of sufficient diameter and depth to receive the compressed side of the grommet after it is released. The lower side of the short cylindrical member 56 and the upper side of the closing plug 28 are provided with circular recesses 94 and 96 respectively, see Fig. 3, which receive the opposite ends of a spring 98. The spring 98 normally urges the sleeve 22 and the inner short cylindrical member 56 with its attached expansible sleeve member 86 in extended relationship. The extension is limited by the abutment of the upper end of member 56 against the shoulder 26.

*In operation*

When it is desired to insert a grommet into a circular aperture in the wall of a casing or the like as shown, the upper end of the expansible sleeve 86 is brought to the position shown in Fig. 4. If the sleeve 86 happens to be in the position shown in Fig. 5, at the time, it may be brought to the position shown in Fig. 4 by first operating the control valve 54 so that the air motor is operated in a downward direction to its downward limit and the sleeve 86 is moved to the position shown in Fig. 3, and then operating the control valve oppositely so that the air motor is operated upwardly to its upper limit of travel. As the motor is operated upwardly, the cylindrical portion 56 and the expansible sleeve 86 which it carries will be stopped intermediately of the upward stroke of the air motor at the position shown in Fig. 4 by reason of the engagement of wing portions 58 with the abutment surfaces 68 of the detent 66. The spring 98 will then be compressed as the air motor completes its full upward stroke. The slots 60 in the sleeve 22 are of such length as to permit the required amount of telescoping of the sleeve 22 and member 56. The engagement of the wings 58 in the slots 62 in the outer sleeve 20 maintains the angular position of these wing members so that they are always in position to engage the detent 66.

Having positioned the expansible sleeve in the position shown in Fig. 4, the wall section 14 of a casing or the like is placed on the surface of support 12 with an aperture 14a over the projecting end of the expansible sleeve and the trip pin 80 is then depressed. Upon depressing the trip pin 80 the detent 66 is rotated counterclockwise out of engagement with the wing members 58 and the spring 98 being released, then operates to move the cylindrical member 56 and the attached expansible sleeve 86 upward to the position as shown in Fig. 5 in which the expansible sleeve is fully expanded and adapted to receive the grommet to be inserted.

The grommet is placed in the end of the expansible sleeve in the manner shown in Fig. 9, and control valve 54 is then operated in a direction to admit compressed air to the upper end of air motor 38 which results in the sleeve 22 being moved downwardly again to the position shown in Fig. 4. As the sleeve 22 moves downward the cylindrical member 56 and the expansible sleeve member 86 are moved with it due to the engagement of the member 56 with the internal shoulder 26 in the sleeve 22. As the sleeve 86 is moved downward its flared end is contracted a sufficient amount, due to its being drawn into the bore 90, and of course through the wall aperture 14a, so that one side of the pliable grommet is compressed sufficiently to be passed through the wall aperture 14a. As the compressed side of the grommet is being drawn through the aperture 14a, the uncompressed side of the grommet engages the wall stopping its further movement through the aperture and the end of the expansible sleeve 86 is caused to slip off of the compressed side of the grommet, whereafter the compressed side of the grommet expands and is properly locked in place with the casing wall.

The sleeve member 86 provides an effective hand tool per se for inserting grooved pliable grommets in wall apertures which are approximately the diameter of the grommet groove. When member 86 is used separately as a hand tool, a grommet is inserted in the flared end as indicated in Fig. 9, the cylindrical end of the sleeve is then passed through the wall aperture and pulled through manually. The flared portion of the sleeve being contracted as it is drawn through the wall aperture.

The foregoing description is intended to be illustrative and not limiting, the scope of my invention being set forth in the appended claims.

I claim:

1. A machine for inserting grooved pliable grommets into wall apertures smaller in diameter than the grommets comprising, a stationary work support having a surface adapted to abut the wall into which a grommet is to be inserted and having a sizing bore therethrough perpendicular to said surface, a contractable sleeve element reciprocating in said bore, said sleeve element consisting of a circular metal tube having a plurality of circumferentially spaced longitudinal slits extending inwardly from one end for a part of the length of said tube so as to provide a plurality of circularly arranged resilient finger members, said fingers being formed so as normally to diverge toward their free outer ends, and said fingers each having a short portion at its outer free end which is formed inwardly relative to its diverging portion to the extent that said short portion is substantially parallel with said tube in its non-contracted condition, whereby said short portions collectively then provide a short contractable cylindrical portion at the flared end of said tube which is adapted to receive a grommet, said tube being positioned with its small end in said bore, and said tube having a sliding fit relationship with said bore, whereby the entire tube, with the exception of the short contractable-cylindrical end portion, assumes a cylindrical shape when drawn into said bore, and whereby said short contractable-cylindrical end portion assumes a frusto-conical shape adapted to facilitate entry into a wall aperture when said sleeve element is projected only slightly outward beyond the surface of said member, and means for reciprocating said sleeve element.

2. A device as claimed in claim 1 which further includes stop means on said fingers a predetermined distance inwardly from the outer ends thereof for limiting the depth of entry of a grommet.

3. A machine for inserting grooved pliable grommets comprising means forming a work holding surface, a sizing aperture in said surface, a sleeve member having an outwardly-flared resiliently-contractable portion at one end, said sleeve member being positioned with its small end in said aperture and with said end snugly fitting said aperture, so as to result in the contraction of said outwardly flared portion as said sleeve member is drawn inwardly into said aperture, said sleeve member having a short portion at the outer end of its flared portion which is substantially cylindrical when said flared portion is in a fully expanded condition and which assumes a frusto-conical shape when said flared portion is contracted, power means for reciprocating said sleeve member between an outward position in which said flared portion is fully expanded and an inward position in which the flared end of said sleeve member is completely within said aperture and fully contracted, a one way connection between said sleeve member and said power means for positively moving said sleeve member in an inward direction, a yieldable connection between said sleeve member and said power means for moving said sleeve member in an outward direction, and releasable stop means for arresting the outward movement of said sleeve member at a point wherein the outer end of said sleeve member projects outwardly a short distance from said work surface but wherein the flared portion of said sleeve member is still retained in a substantially fully contracted position.

4. A device for inserting grooved pliable grommets into wall apertures smaller in diameter than the major diameter of the grommet comprising, a member having a surface adapted to abut the wall into which the grommet is to be inserted and having a bore therethrough perpendicular to said surface, a sleeve element having an outwardly flared, resiliently contractible portion at one end, said sleeve being extended into said bore with its enlarged end outward of the surface of said member so as to result in the contraction of said outwardly flared portion when said sleeve is drawn into said bore, operating means for reciprocating said sleeve member between an outward fully expanded position and an inward position in which said sleeve member is entirely within said bore, a one way connection between said sleeve element and said operating means for positively moving said sleeve member inwardly, a yieldable connection between said sleeve element and said operating means for moving said sleeve member outwardly, and releasable stop means for arresting the outward movement of said sleeve element at a point wherein said sleeve member is projected outwardly a short distance from said bore, but wherein it is still retained in a substantially fully contracted condition.

SIEGFRIED MUELLER.

References Cited in the file of this patent

UNITED STATES PATENTS

| Number | Name | Date |
|---|---|---|
| 2,086,371 | Tear | July 6, 1937 |
| 2,457,930 | Smith | Jan. 4, 1949 |
| 2,468,286 | Behlert | Apr. 26, 1949 |

FOREIGN PATENTS

| Number | Country | Date |
|---|---|---|
| 858,242 | France | May 6, 1940 |